April 7, 1970 W. L. LEYDE 3,505,508
POWER DEMAND MONITOR AND LIMITER
Filed March 6, 1967 3 Sheets-Sheet 1

INVENTOR.
WARREN L. LEYDE
BY
Christensen, Sanborn, & Matthews
ATTORNEYS

April 7, 1970 W. L. LEYDE 3,505,508
POWER DEMAND MONITOR AND LIMITER
Filed March 6, 1967 3 Sheets-Sheet 2

INVENTOR.
WARREN L. LEYDE
BY Christensen, Sanborn, & Matthews
ATTORNEYS

April 7, 1970  W. L. LEYDE  3,505,508
POWER DEMAND MONITOR AND LIMITER
Filed March 6, 1967  3 Sheets-Sheet 3

INVENTOR.
WARREN L. LEYDE
BY
Christensen, Sanborn, & Matthews
ATTORNEYS

United States Patent Office 3,505,508
Patented Apr. 7, 1970

3,505,508
POWER DEMAND MONITOR AND LIMITER
Warren L. Leyde, Seattle, Wash., assignor to Pacific Technology, Inc., Seattle, Wash., a corporation of Washington
Filed Mar. 6, 1967, Ser. No. 620,690
Int. Cl. G01r 21/00; G06f 7/38, 15/56
U.S. Cl. 235—151.31                          17 Claims

ABSTRACT OF THE DISCLOSURE

A system is disclosed for counting and displaying the number of power units that have been used in a given time period and in addition forecasts the total usage at the end of the specified time period based on the current power units already consumed, the time to go until the end of the specified time period, and the rate at which the energy is then being used. The forecasting feature provides an operator with accurate advance warning of a power peak and also gives an immediate indication of the effect of corrective action. A warning is provided if the power forecast indicates that the total consumption at the end of the specified period will exceed a predetermined threshold value. Adjustment of the load is readily accomplished automatically to adjust the power consumption and avoid the predicted overusage. Simplified digital circuitry is utilized in the system and thus high precision analogue devices are eliminated. The system includes apparatus for computing and displaying the rate of energy consumption at any time selected by the operator.

---

Figure 1:
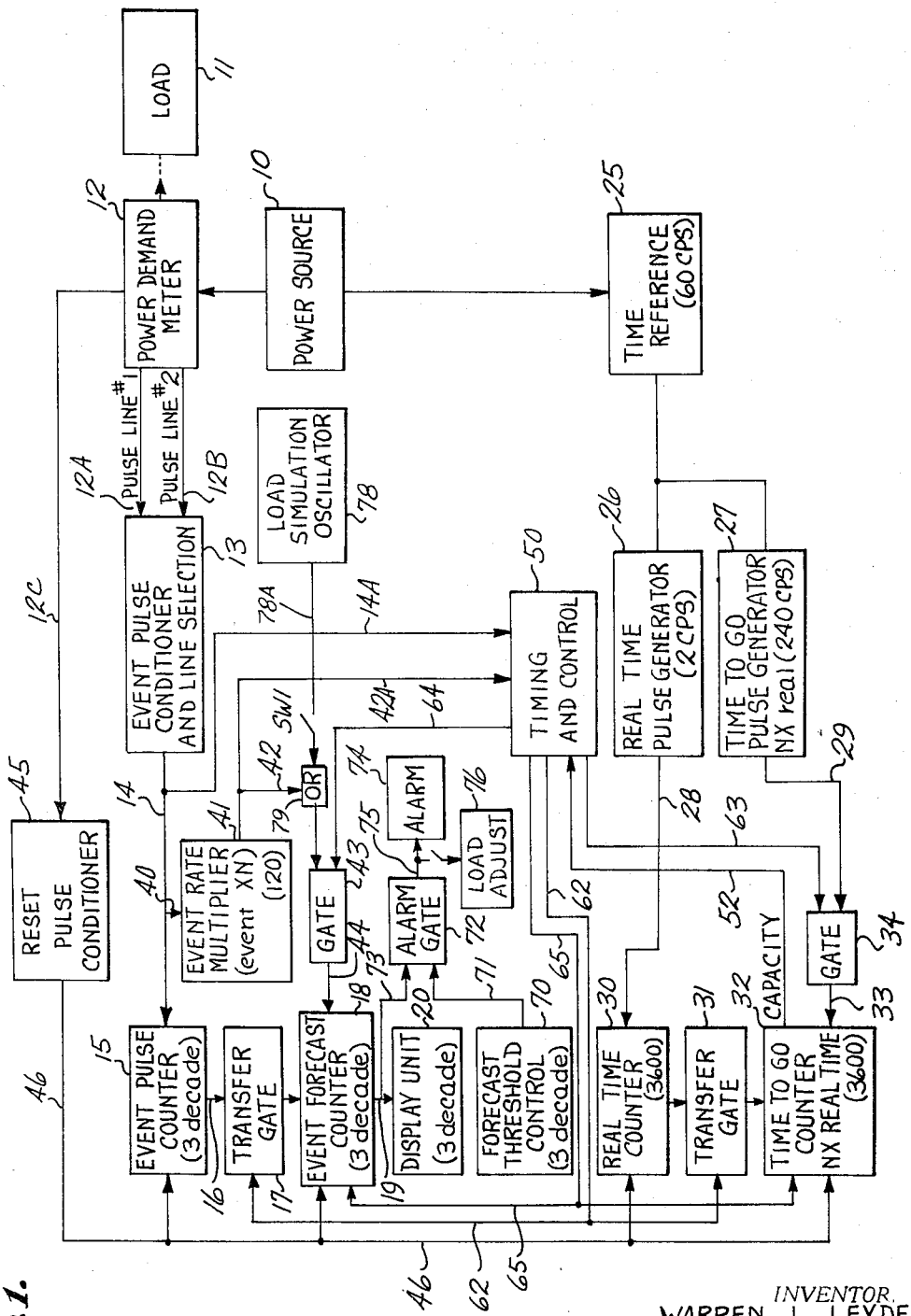

In many industries large quantities of electrical energy are utilized with the energy requirements varying throughout each day. In order to provide the necessary energy for such users it is necessary that an electrical utility have the capability of meeting peak demands. It is advantageous to both the consumer and to the utility to have a substantially constant load condition, but such normally is not obtainable. In many industries a portion of the load can be controlled and thus peak demands could be avoided with maximum energy usage for a given base rate being obtained if a forecast could be rapidly given to the consumer to indicate what the total consumption would be if a given rate were continued. Various devices have been developed to permit the consumer to set his desired power demand limit and to then stay within that limit and avoid overruns and also underusage of the power being purchased. Many such systems depend upon analogue type equipment and hence have the normal disadvantages of a need for high precision devices and accurate adjustments in order to obtain the needed accuracy.

It is thus an object of the present invention to provide an improved power demand monitor for monitoring the electric energy being used and providing continuously updated forecasts of the total consumption based on past usage, rate of usage, and time to go until the end of a given power demand interval. Another object of the present invention is to provide such a system using simplified digital components.

An additional object of the present invention is to provide a power demand monitor and limiting system for automatically adjusting the load in a system to obtain maximum usage of the energy for which a consumer is paying and avoid costly peak demand situations. Another object of the invention is to provide such a system wherein an indication of total usage, forecast usage, as well as current rate of usage are provided. A further object of the invention is to provide a system of the type described wherein the effect of adding or subtracting to a given load can be computed and the result displayed without the need for additional complex equipment.

The above advantages and objects are achieved in accordance with the teachings of the present invention through the use of a digital system wherein spaced pulses are provided by a power measuring device such as a wattmeter to a first pulse counter (event counter). Thus the event counter provides a count which is an indication of the total power consumed starting at the time when the counter was reset. A second digital counter is provided with periodic counting pulses which represent the actual time which has elapsed since reset of the event pulse counter. The second counter is referred to as a real time counter and is adapted to accommodate a maximum count corresponding to the total time interval for which the power consumption is to be forecast. A variable frequency oscillator is connected in a feedback loop arrangement and is coupled with the input circuit for the event pulse counter in a manner such that the oscillator output frequency is some factor N times the rate of occurrence of the event pulses. Similarly an N times real time counter is provided selectively with pulses at a rate which is N times the rate of application of pulses to the real time counter. A forecast counter is coupled with the event counter so that the number of counts in the event counter can be selectively transferred thereto in a non-destructive readout to permit display of the condition of the event counter at any selected time. A timing and control network serves to selectively disable the transfer of pulses from the event counter to the forecast counter and to simultaneously interrupt the transfer of the contents of the real time counter to the N times real time counter (also referred to as the time-to-go counter). At this point the event forecast counter has a count therein corresponding to the number of power counts which have occurred thus far in a given base time interval while the N times real time counter contains a count corresponding to the actual time which has elapsed. The timing and control network then opens appropriate gates to permit the application of pulses at a rate of N times the real time pulse rate to the time-to-go counter so that it reaches its maximum capacity after a time interval corresponding to the actual time remaining to the end of the time base period divided by N. Simultaneously the variable frequency oscillator outputs signals are gated to the event forecast counter so that the event forecast counter counts at a rapid rate corresponding to N times the actual event rate with the input to the forecast counter being terminated when the N times real time counter reaches its maximum capacity. Thus it will be seen that the forecast counter at that point provides an accurate forecast of what the total power pulse count would be if the then existing rate were continued for the time remaining in the time base period.

After displaying the forecast for any selected time the timing and control network then causes the event forecast counter to be cleared and the contents of the event pulse counter re-read into the event forecast counter for an indication of the existing total event count.

A switch is provided to permit selective actuation of the system for display of the existing rate of energy pulse occurrence. Closure of the switch serves to clear the event forecast counter and the N times real time counter and also disable the transfer gates. Output signals from the variable frequency oscillator which is operating at a frequency of N times the rate of occurrence of the event pulses are then fed to the event forecast counter while simultaneously the N times real time counter is provided with counting pulses at a rate of N times the rate of the real time pulses. When the N times real time counter reaches its capacity the gate between the variable frequency oscillator and the forecast counter is closed so that the forecast counter then provides a numeric indication of the rate of event pulses per time base interval based upon the then existing rate of occurrence of event pulses.

The variable frequency oscillator used in one specific system includes a voltage controlled oscillator connected in a circuit arrangement such that its output frequency is always N times the rate of occurrence of two successive event pulses. The arrangement is such that an exact multiple of the event pulses rate is provided even though the rate of occurrence of the event pulses changes.

Figure 2:
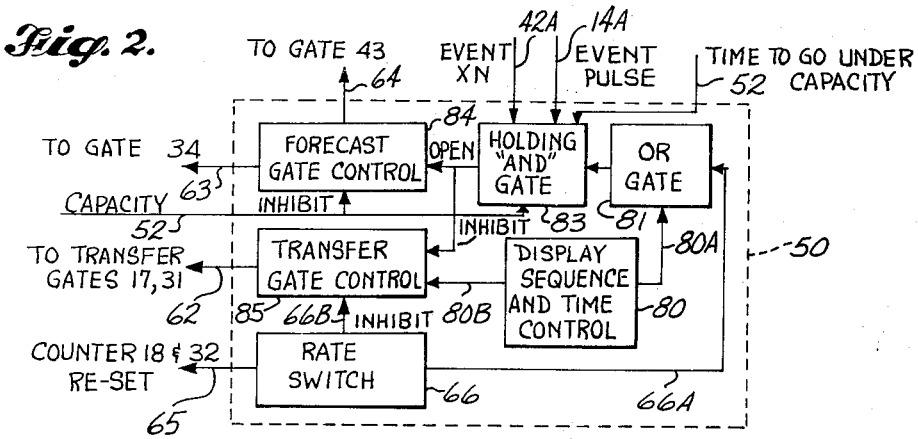
Figure 3:
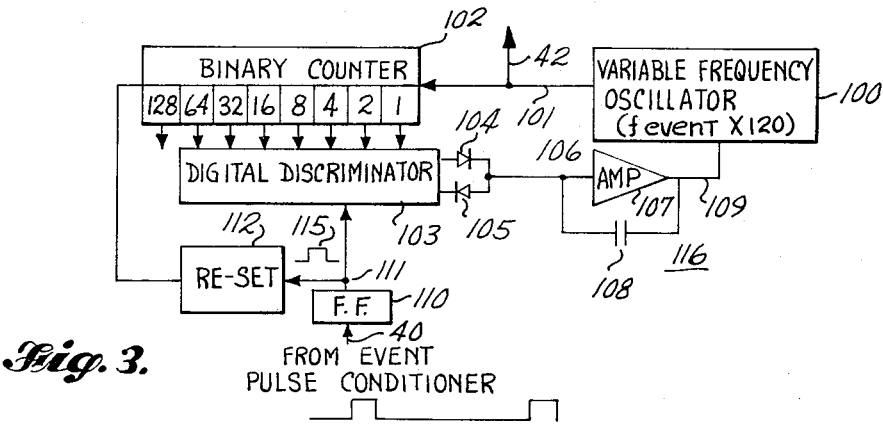
Figure 4:
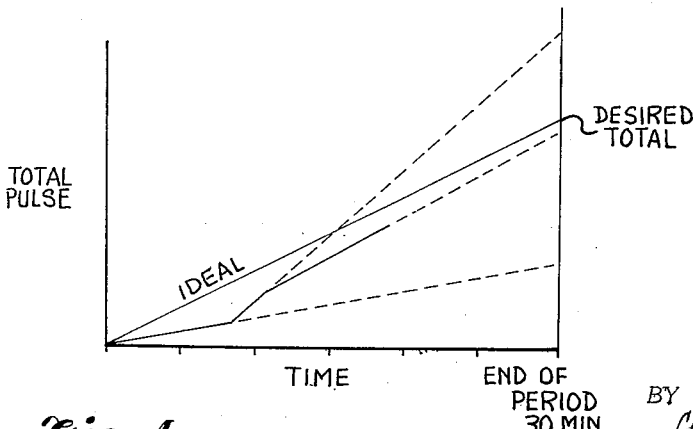
Figure 2A:
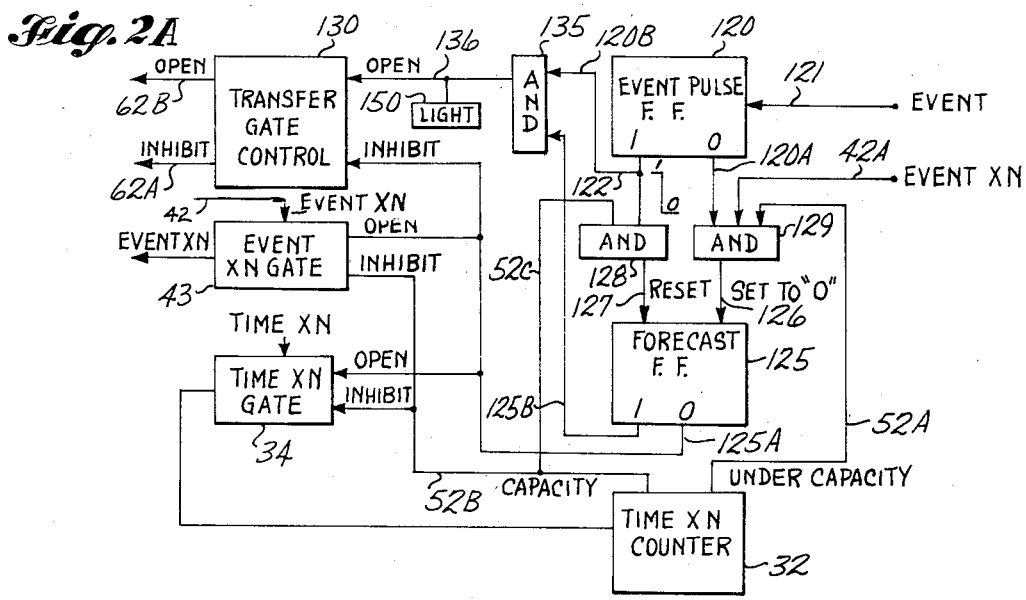
Figure 5:
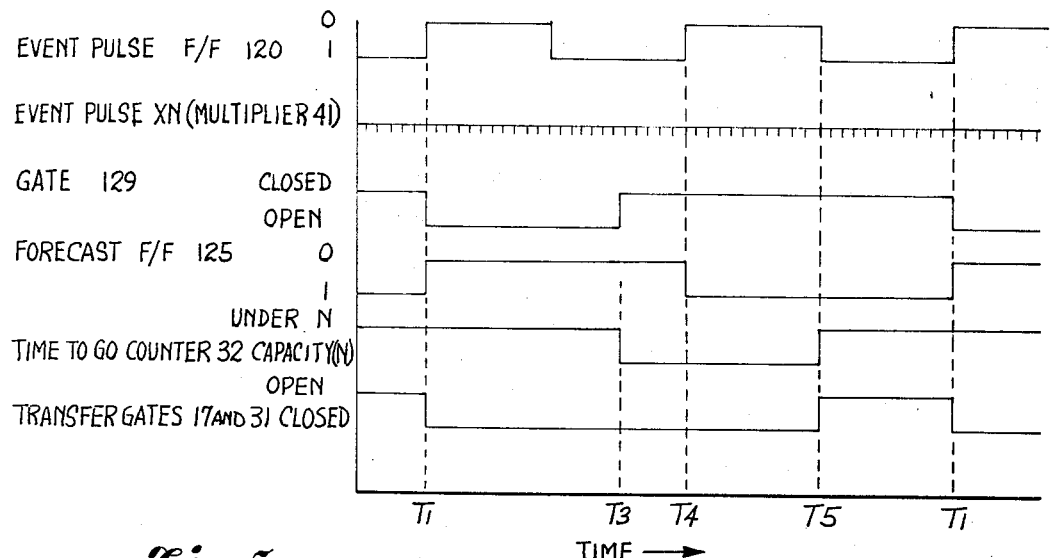

The invention will be more clearly understood from the following description when read with reference to the accompanying drawings and wherein, FIGURE 1 is a block diagram of an overall system.
FIGURE 2 is a block diagram of one timing and control network for the system of FIGURE 1.
FIGURE 2A is a block diagram of one timing and control system which alternately causes the true event count and the forecast event count to be displayed.
FIGURE 3 is a block diagram of the $f$ event times N loop in the system of FIGURE 1.
FIGURE 4 is a graph illustrating the manner of operation of the system. FIGURE 5 is a timing diagram referred to in cnnnection with FIGURE 2A.

In the preferred embodiment of the invention illustrated in FIGURE 1 the system is shown in block diagram form for ease in teaching the invention. To further facilitate an understanding of the invention the block diagram of FIGURE 1 includes in the blocks of the various components an indication in parentheses of specific pulse rates, counter capacities, and similar information for one specific system in order to illustrate the relationship of the counts, frequencies, and capacities of the various components.

The system of FIGURE 1 is shown as monitoring the power from a power source 10 which provides electric energy to any suitable load indicated generally at 11. A conventional power meter 12 is connected in circuit between the source 10 and the load 11 and can, for example, be any conventional meter. In practice a rotating disk type of wattmeter is typically utilized with the disk being provided with a pair of diametrically opposed holes or slots therethrough so that a photocell positioned adjacent to the disk on one side thereof will be intermittently energized when light from an associated source passes through the holes in the disk. Thus the power meter 12 is shown as having first and second signal output lines 12A and 12B for providing pulses alternately on these two lines. The pulses from the power meter will be spaced in time by an amount proportional to the rate of rotation of the meter disk and thus the total number of pulses provided by the meter will be proportional to the power consumed by the load during the pulse counting interval.

The pulses from the meter will be referred to hereinafter as event pulses. The event pulses are applied to the event pulse conditioner and line selector 13 which serves to convert the pulses to a voltage level suitable for internal use in the system. For reasons described hereinafter, the conditioner 13 also contains a bistable circuit at its input so that whichever line 12A or 12B provides the first pulse during a given time base period will serve to lock out pulses on the other line. The pulses from the conditioner 13 are applied by circuit 14 to an event pulse counter 15 which in the specific system is a three decade binary-decimal counter.

The output circuits 16 from the event pulse counter 15 are coupled through the transfer gate 17 to an event forecast counter 18 which in the one specific system was of the three decade type capable of counting to 999. The output circuits 19 from the event forecast counter 18 are coupled by circuits 19 to the three decade display unit 20 which can be any one of a number of suitable visible indicator decade display units available commercially. The interconnections of the counters and the display unit are such that when the transfer gate 17 is open the event forecast counter 18 will receive the count from the event pulse counter 15 and serve to cause the display unit 20 to display an indication of the count in the event forecast counter. The transfer of the count from the event pulse counter 15 is non-destructive, with the arrangement such that when the gate 17 is opened the event pulse counter 15 immediately assumes the count in counter 15 and then continues to count in synchronism therewith.

A timing reference source 25 is coupled with the power source 10 and serves to provide output signals at a frequency determined by the power source. By using the same A.C. power supply 10 for the motor in the power demand meter and for the timing source 25, short time fluctuations in the line frequency are effectively canceled in the system.

Signal from the source 25 are applied to a real time pulse generator 26 and to a pulse generator 27 which is labeled as the "N times real time pulse generator." In one specific system the real time pulse generator consisted of binary dividing circuitry which operated to divide the 60 per second signals from the timing reference source 25 down to 2 cycle per second output signals. Similarly the counter 27 of the binary multiplication type and operative to provide output signals at 4 times the rate of the timing reference source 25. The net result in the specific system is that the output signals on the lead 28 from the time generator 26 are at 2 cycles per second and the signals from the generator 27 on the output lead 29 are at a rate of 240 cycles per second.

The output circuit 28 of the generator 26 is coupled as the input circuit for a real time counter 30 which is operative to count the real time pulses and thus contain a count proportional to the time elapsed since application of the first real time pulse thereto. In the specific system described a 30 minute base period was desired and thus the real time counter 30 had a counting capacity of 3600 counts.

The output circuits from the real time counter 30 are coupled by the second transfer gate 31 to the "time-to-go counter" 32 which is also labeled to indicate that it counts the "N times real time" pulses. The capacity of the counter 32 in the specific system was 3600 counts. The counter 32 has a second input circuit 33 which is coupled by the gate 34 to the output circuit 29 from the pulse generator 27. The arrangement is such that when the gate 34 is opened the counter 32 receives pulses from the generator 27 at a rate which is N times the rate of occurrence of the real or actual time pulses from the pulse generator 26.

The output circuit 14 of the event pulse conditioner 13 is coupled by the circuit 40 to an event rate multiplier 41 which serves to multiply the rate of occurrence of the event pulses and provides output pulses at a rate which is N times the rate of occurrence of the event pulses from the pulse conditioner 13. In the specific example given the time between two adjacent event pulses is taken up by exactly 120 pulses from the event rate multiplier 41 and applied via its output circuit 42 to the gate 43 which controls the application of input signals to the input circuit 44 for the event forecast counter 18. In practice it is advantageous to use only every other pulse from the condiitoner 13 in the multiplier 41, and then operate the oscillator to provide an output at 240 times the rate of pulses applied thereto. The net result however is still a series of pulses at a rate of N times the current rate of event pulses from the conditioner.

The operation of the system in FIGURE 1 is as follows. At the start of a time monitoring period the power meter applies a reset signal via circuit 12C to the reset pulse conditioner 45, which in turn applies a reset signal via circuit 46 to each of the counters. This establishes the zero point in time. Thereafter the counter 15 counts each event pulse from the conditioner 13 and the time counter 30 starts counting the real time pulses. A timing and control network 50 controls the display of information and initiates the power demand forecasts by providing output signals on its various control circuits.

The output circuit from the timing and control network 50 shown as the circuit 62 is coupled with the transfer gates 17 and 31 and normally maintains the transfer gates in an open (i.e. information passing) condition so that the count in the event forecast counter 18 corresponds to the count in the event pulse counter 15, and the N times real time counter 32 contains a count corresponding to the time elapsed in the time base period. The display unit 20 displays the count in counter 18. After the elapse of a selected time (which can be set in the timing and control network 50) the transfer gates 17 and 31 are closed (i.e. signal passage blocked) by a signal on line 62 and the gate control circuits 63 and 64 from the timing and control network 50 are provided with appropriate signals for opening the gates 34 and 43. Thus signals from the event rate multiplier 41 and from the pulse generator 27 are respectively applied to the event forecast counter 18 and to the counter 32. Signals from the event rate multiplier continue to be applied to the event forecast counter until the counter 32 reaches its capacity (3600 counts in the specific example given). It will be seen that the time interval during which the pulses are applied to the counters 18 and 32 corresponds to the actual time remaining until the end of the base time interval divided by N. When the counter 32 reaches its capacity a signal is provided on the lead 52 to the timing and control network 50 to cause the gates 43 and 34 to close and prevent the further application of signals to the event forecast counter. Since the forecast counter receives pulses from multiplier 41 at a rate of N times the actual event rate and for a time equal to $1/N$ of the actual time remaining, it will be seen that at this instant the event forecast counter contains a count corresponding to the sum of the counts existing therein prior to start of the forecast plus a number of counts which it would have received from the event pulse counter had the same rate of occurrence of event pulses continued throughout the remaining time in the time base period. An accurate straight-line extrapolation is therefore provided with the display unit 20 indicating to an operator the total event count (and thus total power used) which would be reached during the total time period if the then existing rate of usage were continued until the end of the time period.

After the event forecast has been displayed for any selected time (typically several seconds) the transfer gates 17 and 31 are again opened by control unit 50 and the event forecast counter 18 reverts to a count corresponding to that in the event pulse counter 15 and the counter 31 returns to a count corresponding to that of the counter 30. The display unit then displays the actual event count which has occurred up to that time in the base time period. After the actual event pulse count has been displayed for the selected time called for by the control unit 50 (typically several seconds) a new forecast is called for by the timing and control network 50 and the above sequence again occurs. Thus the display unit automatically alternates between a display of the actual event count and the forecast event count at the end of the period. Seperate display units could obviously be used to display the two counts, but with the present arrangement a substantial parts saving is achieved.

The system includes a forecast threshold control unit 70 which can be set to the desired maximum pulse count desired during the time base period. The forecast threshold control 70 is coupled by the circuit 71 to the alarm gate 72 whish is similarly coupled by circuit 73 to the event forecast counter 18. The alarm gate 72 is in effect three threshold gates which serve to continuously compare the three decades of the counter 18 to the settings of the three decades of the threshold unit 70 and provide an output signal to the alarm device 74 should the event forecast counter 18 achieve a count equal to or greater than that of the forecast threshold unit 70. The alarm device 74 typically includes a hold-in relay and audio and/or visual indicator. The output circuit 75 of the alarm gate 72 can also be coupled with the load adjustment system 76 to automatically adjust the condition of the load 11 in a downward direction.

From the above it will be seen that the system repeatedly makes straight-line predictions of the final impulse count based upon the count which has occurred prior to each forecast plus the count which would occur if the then existing rate of occurrence of event pulses were continued for the remaining interval of the time base period. This is shown in the graph of FIGURE 4 wherein the dashed lines illustrate how the slope of the usage curve is repeatedly extrapolated in a straight-line manner to the end of the time period.

In many applications it is desirable to know the rate at which the event pulses are occurring. Thus the timing and control system 50 includes an output circuit 65 which is coupled with the event forecast counter 18 and with the N times real time counter 32 for selectively resetting these counters to zero. When the circuit 65 is energized and the transfer gates 17 and 31 are closed, either automatically or by the manual switch 66 (FIGURE 2) described hereinafter, and the gates 34 and 43 are opened, the counter 32 will start from zero and count pulses from the generator 27 and the counter 18 will start from zero and count pulses from the event rate multiplier 41. A forecast is then made in the manner previously indicated but with the forecast being based on a total base time period remaining so that when the counter 32 reaches its capacity and closes gates 43 and 34 the event forecast counter will contain a count corresponding to the total count which it would receive for an entire time base period if the then existing rate were continued throughout a total time base period. Thus it will be seen that a simplified arrangement is provided for obtaining the event pulse rate.

In many cases it would be advantageous to an operator if he could insert into the system the effect of a given load change and observe such effect before actually making the load change. The digital nature of the present system, and the manner in which it operates, makes possible this feature with a minimum number of parts. Thus the system of FIGURE 1 includes a manually adjustable load simultation oscillator 78 which provides output signals at a selective rate proportional to the rate at which the meter 12 would provide event pulses in response to the simulated load. In the specific system the oscillator 78 provides pulses at a rate of N×the rate at which the event pulse conditioner 13 would provide pulses on its output line 14 in response to the simulated load condition. These pulses are applied via line 78A and manual switch SW1 to the OR gate 79 and thence to the event forecast counter 18 when the gate 43 is open for computation of a forecast.

Thus the pulses from oscillator 78 are added to the pulses from the rate multiplier 41 by the forecast counter 18 so that the indicated forecast when SW1 is closed will correspond to what the forecast would be if the simulated load were actually added or subtracted from the load 11. The operator can thus adjust the simulated load conditions to the point where the desired effect on the forecast is indicated before actually changing the load.

Turning now to FIGURE 2 a more detailed illustration is provided for one type of timing and control network 50 shown in the system of FIGURE 1. The timing and control network 50 of FIGURE 2 includes a display sequence and control unit 80 which determines the sequence in which the data will be displayed and the duration of such display. It is provided with a first signal output circuit 80A which is coupled with an "OR" gate 81 having a second input circuit 66A coming from the rate switch 66 which can be manually operated for obtaining an indication of the present rate of occurrence of event pulses.

The output circuit of the "OR" gate 81 serves as the input circuit for the "AND" gate 83 which is of the type which includes a bistable circuit and thus labeled as a "holding" AND gate. It will be seen that the gate 83 is coupled via circuit 42A to the event rate multiplier 41, via circuit 14A to the event pulse conditioner 13, and via line 52 to the counter 32. The arrangement is such that the gate 83 is opened and remains open (i.e. provides an output signal) for the passage of a control signal from gate 81 in response to the simultaneous presence of an event×N pulse, the occurrence of an event pulse, and a signal on line 52 indicating that the time-to-go counter 32 is not at capacity. By having the start of a forecast coincident with a pulse from the event multiplier and the existence of an event pulse the possibility of a one pulse ambiguity is removed. When these conditions exist and the display sequence and time control unit 80 provides an appropriate signal thereto, a signal is provided to the forecast gate control unit 84 causing that unit to open gates 34 and 43 and thus permit the passage of counting signals to the event forecast counter 18 and to the time-to-go counter 32. Simultaneously, an inhibit signal is provided through the AND gate 83 to the transfer gate control driver 85 causing it to apply an inhibit signal via circuit 62 to the transfer gates 17 and 31. The forecast is then made in the manner described above. Thus the timing and control network 50 causes the forecast to be made and also causes a display of the same to be retained for a selected time interval. It will be seen that the forecast gate control unit 84 has the output circuit 52 from the time-to-go counter 32 coupled therewith in a manner such that when the counter 32 reaches its capacity an inhibit signal is applied to the forecast gate control 84 to prevent the further application of counting signals to counters 18 and 32. The inhibit signal from counter 32 on line 52 is also applied to the gate 83 to reset the bistable circuit therein and thus close the gate. The display sequence and time control unit 80 has a second output circuit 80B coupled with the transfer gate control 85 to prevent opening of the same until permitted by unit 80. Thus the computed forecast will remain displayed for any selected time called for by the display sequence and time control unit 80.

The rate switch 66 will be seen to be connected in what is effectively an over-ride manner in that when the rate switch 66 is closed an inhibit signal is applied via circuit 66B to the transfer gate control 85 causing the transfer gates 17 and 31 to be closed (i.e. signal transfer inhibited). When the rate switch is closed a signal is applied via line 65 to the counters 18 and 32 which returns them to zero. Simultaneously the rate switch provides a signal on its output circuit 66A to the OR gate 81 so that when the counters 18 and 32 have been reset as a result of the signal on the circuit 65 the AND gate 83 will be opened on occurrence of the next event×N pulse during the presence of an event pulse. Thus a normal forecast takes place with the exception that the counters 18 and 32 are reset at the onset of the forecast. A rate forecast is therefore obtained.

Turning now to FIGURE 3 the details of one particular embodiment of the event rate multiplier 41 in the system of FIGURE 1 will be described. The system of FIGURE 3 is basically a feedback loop arrangement wherein a variable frequency oscillator 100 has its output circuit 101 connected to an eight-stage binary counter 102. The output circuits from the binary counter 102 are applied to a digital discriminator 103 which at a given instant in time serves to apply an appropriate voltage level signal via one or the other of the diodes 104 or 105 to the input circuit 106 of an integrating circuit 116 which includes the amplifier 107 and capacitor 108 connected in parallel therewith. The output circuit 109 of the integrator serves as the input control for the variable frequency oscillator 100. A voltage controlled oscillator is advantageously utilized as the variable frequency oscillator with the frequency of the output signals therefrom being determined by the level of the voltage on its input circuit 109.

The system of FIGURE 3 operates as follows. The input circuit 40 for the event rate multiplier circuit 41 will be seen in FIGURE 1 to be coupled with the event pulse conditioner 13. The circuit 40 is connected to the input bistable circut or flip-flop 110 having an output circuit 111 coupled with the digital discriminator 103 and with a reset control circuit 112 which is coupled with the binary counters 102. In the specific system of FIGURE 1 each event pulse serves to trigger the flip-flop 110 which in effect divides by two and causes 8 millisecond square wave signals to be applied on its output circuit 111 at one half the rate of occurrence of the event pulses from unit 13. By using alternate pulses symmetry problems which can arise due to incoming signals being alternately close together and far apart are avoided. By having the loop itself multiply by 240 it will be seen that a net multiplication of 120 is achieved.

When the leading edge of the reset signal 115 is applied to the digital discriminator the digital discriminator in effect compares the count then existing in the binary counter 102 to a true count of 240. The timing capacitor for the integrating circuit 116 is discharged and then brought back to a level corresponding to the level determined by the output circuits of the digital discriminator 103. If the binary counter 102 stands exactly at 240 when the signal 115 occurs the voltage on the timing capacitor in the integrating circuit will be established at the proper level for the output of the variable frequency oscillator to be exactly 240 times the rate of occurence of the reset control signals 115. If the binary counter is at a lower count the voltage on the timing capacitor is increased by an appropriate amount to cause the frequency of the oscillator to be increased. If the count in the binary counters is above 240 the voltage on the timing capacitor is proportionately reduced.

When the trailing edge of the reset pulse 115 occurs the reset circuit 112 serves to reset each of the binary counters to zero and causes the voltage then existing on the timing capacitor for the integrating circuit as a result of the above adjustment to remain at the predetermined fixed level. Thus the oscillator starts each multiplication period at a frequency which is such that the spacing between the last two occurring pulses from the trigger flip-flop 110 is filled by 240 pulses. The binary counter 102 starts counting output signals from the variable frequency oscillator on termination of the reset signal with the above procedure being repeatedly carried out so that the output signals on the circuit 42 from the variable frequency oscillator 100 will be exactly 240 times the frequency of the signals 115 coming from the flip-flop 110. Thus the loop serves to provide output signals at a rate equal to 120 times the rate of occurrence of the event pulses based upon the most recent event pulse spacing. It is obvious that using the same techniques the multiplication factor N can be set at any desired value.

In some applications the system requirements are such that alternate displays of the true event count and of the forecast count are suitable without any need for altering the alternating display or the time of each display. In such cases the display sequence and time control unit 80 of FIGURE 2 can be simplified with direct control being provided by the various counters and timing circuits. Thus there is illustrated in FIGURE 2A one specific timing and control network 50 adapted for such automatic alternating display of the true event and forecast counts. Turning now to FIGURE 2A it will be seen that like parts corresponding to those in FIGURES 1 and 2 bear the same reference numeral. The control system of FIGURE 2A includes an event pulse bistable circuit of flip-flop 120 adapted to receive the event pulses on its input circuit 121 and to provide an output signal on one or the other of its output circuits 122 or 123. A second bistable circuit indicated as a forecast flip-flop 125 has a pair of input circuits labeled as a "set to zero" input circuit 126 and a "reset" circuit 127. The condition of the forecast flip-flop 125 is controlled by the AND gates 128 and 129.

The operation of the system of FIGURE 2A will be best understood by reference to FIGURE 5 along with FIGURE 2A. Since the event×N pulses occur at a much higher rate than the other signals shown in FIGURE 5 these pulses are not all shown, only a sufficient number being included to facilitate an understanding of the system. The flip-flop 125 is set to its zero condition at time $T_1$ when the event pulse flip-flop 120 has received an event pulse and thus is in its "zero" condition, the event times N multiplier 41 has provided an input pulse on lead 42A, and the time-to-go counter 32 provides a signal on its lead 52 which indicates that the counter 32 has not reached its capacity. When these three conditions exist simultaneously the forecast flip-flop 125 changes to its zero condition and provides a positive output control signal on its output circuit 125A. This circuit will be seen to be coupled to the counter gate circuits 34 and 43 and also to the transfer gate control unit 130. The arrangement is such that the zero condition of forecast flip-flop 125 serves to open gates 34 and 43 and simultaneously cause the transfer gate control unit 130 to apply an inhibit sigal via circuit 62A to the transfer gates 17 and 31.

The first count registers in counter 18 following the "0" which allowed the forecast flip-flop to open the gates 43 and 34. A forecast then takes place at N×real time in the manner previously described.

The forecast is terminated at time $T_3$ when the counter 32 reaches its capacity. At this time the output circuit 52B from the counter 32 applies an inhibit signal to the gates 34 and 43. The full capacity signal on line 52B is also applied via the branch circuit 52C as an input to the two-level AND gate 128 in preparation of reset of the forecast flip-flop 125. The AND gate 128 however remains closed until the event pulse flip-flop undergoes a change from a "1" condition to a "0" condition at time $T_4$. It should be noted that it is the change in condition from "1" to "0" in flip-flop 120 which resets flip-flop 125. When this occurs the AND gate 128 passes a reset signal via input circuit 127 to cause the forecast flip-flop 125 to change to its "1" condition. The "1" output circuit 125B of the forecast flip-flop 125 will be seen to be applied as an input circuit to the AND gate 135 which controls the "open" circuit 136 for the transfer gate control unit 130. The second input circuit for the AND gate 135 is the "1" circuit of the event pulse flip-flop.

It will be seen that the forecast flip-flop cannot change to its "1" condition until the event pulse flip-flop undergoes a change from a "1" to a "0." Therefore when the flip-flop 125 is reset the flip-flop 120 is in a "0" condition and the AND gate 135 cannot at that instant ($T_4$) pass an open signal to the transfer gate control 130. When the next event pulse is applied to the event pulse flip-flop it then changes from its "0" condition back to its "1" condition at time $T_5$ and the gate 135 then causes the gate control 130 to open the transfer gates and energize the indicator 150 to show the operator that the time event count is again being displayed.

From the above it will be seen that the forecast will always be displayed for at least the time interval between a pair of event pulses. Once the true event count is again displayed it will be seen that the counter 32 will no longer be at full capacity (unless the end of the time base period has actually been reached) and the system of FIGURE 2A will be reconditioned for reoccurrence of the above sequence. It will be seen that the forecast is displayed between times $T_3$ and $T_5$ and the time event count is displayed between $T_5$ and $T_1$.

There has been disclosed an improved and simplified power demand monitor and limiting system which makes use of simplified digital circuitry components. While the invention has been disclosed by reference to presently preferred embodiments, it is to be understood the same has been done for purpose of teaching the invention and that these changes and modifications which become obvious to a person skilled in the art as a result of the teachings hereof will be encompassed by the following claims.

What is claimed is:

1. A power demand monitoring system comprising in combination: a signal source providing output event signals at a rate proportional to the rate at which energy is being used by the system being monitored; an event signal counter; means connecting said source to said counter; an event rate multiplier coupled with said source and providing output signals at a rate of N times the rate of application of signals to said counter; a first timing signal generator; a first time counter coupled with said signal generator; means including a second timing signal generator providing output signals at a rate of N times the rate of output timing signals from said first signal generator; a second time counter; a second event signal counter; first signal transfer control means coupled with said first and second event signal counters and with said first and second time counters and selectively operable for permitting or inhibiting the transfer of the count in said first event counter and said first time counter to said second event counter and to said second time counter, respectively; information output means coupled with said second event counter; second signal transfer control means coupled with said event rate multiplier and said second event counter and with said second signal generator and said second time counter; and timing control means coupled with said first and second signal transfer control means and with said second time counter for selectively permitting and inhibiting the transfer of the count in said first event counter to said second event counter and the count in said first time counter to said second time counter, and for selectively permitting and inhibiting the application of signals from said rate multiplier to said second event counter and the application of signals from said second signal generator to said second time counter.

2. A system as defined in claim 1 wherein said timing control means includes means coupled with each of said signal transfer means and with said second time counter and inhibiting the transfer of the count in said first counters to said second counters respectively at a first time, permitting the application of signals from said rate multiplier and said second generator to said second event counter and to said second time counter respectively starting at a second time substantially coincident with said first time, and then terminating the application of signals from said rate multiplier to said second event counter and from said second generator to said second time counter when said second time counter achieves a predetermined setting.

3. A system as defined in claim 1 wherein the counting capacities of said first and of said second time counters are the same.

4. A system as defined in claim 1 and including rate control means coupled with said second counters for resetting the same to zero, with said first signal transfer control means for inhibiting the transfer of the count in said first counters to said second counters, and with said second transfer control means to start the transfer of signals from said rate multiplier and said second generator to said second event counter and to said second time counter, respectively.

5. A system as defined in claim 1 wherein said information output means includes a visual display unit displaying the count in said second event counter.

6. A system as defined in claim 1 wherein said information output means includes a settable count threshold device, and alarm circuit means coupled with said threshold device and with said second event counter and providing an alarm when the count in said second event counter corresponds to the setting of said threshold device.

7. A system as defined in claim 1 and including threshold count means coupled with said second event counter, and load adjustment means coupled with said threshold count means and operative to adjust load conditions when the count in said second event counter becomes equal to the setting of said threshold count means.

8. A system as defined in claim 1 and including a load simulation signal generator providing output signals at a selected rate, and means selectively connecting the signal output circuit of said load simulation signal generator with said second event counter.

9. A system as defined in claim 1 wherein said timing control means includes circuit means coupled with said event rate multiplier and preventing initial application of signals to said second counters from said second signal generator and said multiplier until the occurrence of a signal from said multiplier.

10. A system as defined in claim 1 wherein said timing control means includes means alternately opening said first transfer control means and closing said second transfer control means for a first time interval and then closing said first transfer control means and opening said second transfer control means for a second time interval.

11. A system as defined in claim 10 wherein said timing control means includes means coupled with said second time counter and terminating said first time interval when said second time counter reaches a predetermined count.

12. A system as defined in claim 11 wherein said timing control means includes means delaying the start of a said second time interval following the end of a said first time interval.

13. A system as defined in claim 1 wherein said timing control means includes first and second bistable circuits; means coupling an input circuit of said first bistable circuit with said signal source; a first signal gate means coupling said second time counter, said rate multiplier, and an output circuit of said first bistable circuit with a first input circuit of said second bistable circuit; a second signal gate means coupling an output circuit of said first bistable circuit and said second time counter to an input circuit of said second bistable circuit; circuit means connecting said second time counter and said second bistable circuit with said second transfer control means; and a third signal gate means connecting said first and second bistable circuits with said first transfer control means.

14. A system as defined in claim 13 wherein said third signal gate means includes an "AND" gate which is opened only when said first and second bistable circuits are in a first condition; said second signal gate means includes an "AND" gate which opens only in response to a change in said first bistable circuit from said first to a second condition when said second time counter is at a predetermined count, and said second bistable circuit is placed in a first condition in response to a signal from said second gate means.

15. A system as defined in claim 14 wherein said second bistable circuit is placed in a second condition in response to a signal from said first gate means, and said first gate means includes an "AND" gate.

16. A system as defined in claim 1 wherein said event rate multiplier includes circuit means adjusting the output frequency of the signals therefrom such that N signals from the rate multiplier occur in substantially the time between each two adjacent event count signals applied to said first event counter.

17. A system as defined in claim 16 wherein said circuit means includes a variable frequency oscillator having an input and an output circuit, a counting circuit coupled with said output circuit, and means including a count comparing circuit connected to said counting circuit and said input circuit operative to periodically compare the count in said counting circuit with a predetermined count and adjust the frequency of said oscillator in accordance with said comparison.

References Cited

UNITED STATES PATENTS 3,296,452  1/1967  Williams _____ 235—151.21 XR
3,387,121  6/1968  Maczuzak et al. ___ 235—151.21

MALCOLM A. MORRISON, Primary Examiner

E. J. WISE, Assistant Examiner

U.S. Cl. X.R.

235—151.21; 324—103